United States Patent [19]

Bierschenk et al.

[11] Patent Number: 4,760,198

[45] Date of Patent: Jul. 26, 1988

[54] 1:1 COPOLYMER OF DIFLUOROMETHYLENE OXIDE AND TETRAFLUOROETHYLENE OXIDE AND SYNTHESIS

[75] Inventors: Thomas R. Bierschenk; Timothy J. Juhlke, both of Roundrock; Richard J. Lagow, Austin, all of Tex.

[73] Assignee: Exfluor Research Corporation, Austin, Tex.

[21] Appl. No.: 796,625

[22] Filed: Nov. 8, 1985

[51] Int. Cl.$^4$ .................... C07C 43/11; C07C 59/135; C08G 65/32

[52] U.S. Cl. .................................. 568/615; 525/409; 528/402; 560/180; 560/184; 562/583; 562/586

[58] Field of Search ................ 562/583, 586; 568/615; 560/180, 184; 528/402; 525/409

[56] References Cited

U.S. PATENT DOCUMENTS

| | | | |
|---|---|---|---|
| 2,839,513 | 6/1958 | Ahlbrecht et al. | 562/583 X |
| 3,125,599 | 3/1964 | Warnell | 562/586 |
| 3,250,806 | 5/1966 | Warnell | 562/583 |
| 3,250,807 | 5/1966 | Fritz et al. | 562/583 |
| 3,665,041 | 5/1972 | Sianesi et al. | 568/677 |
| 3,715,378 | 2/1973 | Sianesi et al. | 568/677 X |
| 3,770,792 | 11/1973 | Sianesi et al. | 568/677 X |
| 3,847,978 | 11/1974 | Sianesi et al. | 562/586 |
| 4,085,137 | 4/1978 | Mitsch et al. | 562/583 X |

OTHER PUBLICATIONS

Eleuterio et al., *J. Macromol, Sci–Chem.*, A6(6), pp. 1027–1052, (Jun. 1972).

Lippard, *Progress in Inorganic Chemistry*, vol. 26, pp. 162–210 (Dec. 1979).

*Primary Examiner*—Werren B. Lone
*Assistant Examiner*—Vera C. Clarke
*Attorney, Agent, or Firm*—Hamilton, Brook, Smith & Reynolds

[57] ABSTRACT

Perfluoropolyethers containing an approximate equal number of difluoromethylene and tetrafluoroethylene repeat units distributed either randomly or in alternating sequence along the polymer chain are disclosed. The polymers range in molecular weight from 500–200,000 amu; the lower molecular polymers being fluid and the intermediate and high molecular weight polymers being solid. The perfluorinated copolymers are synthesized by direct fluorination of corresponding methylene oxide/ethylene oxide copolymers.

7 Claims, No Drawings

1:1 COPOLYMER OF DIFLUOROMETHYLENE OXIDE AND TETRAFLUOROETHYLENE OXIDE AND SYNTHESIS

FIELD OF THE INVENTION

This invention is in the field of fluorine chemistry and more particularly in the field of direct fluorination.

BACKGROUND

Perfluoroalkylpolyethers are of current interest for many new material applications due to their lack of chemical reactivity and their outstanding thermal stability. Their remarkable stability, comparable to that of perfluoroalkanes, along with their interesting surface properties, viscosities and broad liquid ranges make saturated perfluoropolyethers attractive solvents, hydraulic fluids, heat transfer fluids, vacuum pump oils, lubricants, and grease base stocks. Very high molecular weight perfluoropolyether solids have potential uses as sealants, elastomers, and plastics. See Paciorek, K. J. L, Kaufman, J., Nakahara, A., *Journal of Fluorine Chemistry*, 10, 277 (1977); McGrew, F. C., *Chemical Engineering News*, 45, 18 (August 7, 1967); Eleuterio, H. S., *Journal of Macromolecular Science-Chemistry*, A6, 1027 (1972).

Several synthetic methods exist for preparing saturated perfluoropolyethers. The anionic polymerization of perfluoroepoxides, particularly hexafluoropropylene oxide and tetrafluoroethylene oxide, have been used with success. See Hill, J. T., *Journal of Macromolecular Science-Chemistry*, A6, 1027 (1972). The preparation of perfluoropolyethers via this method first involves the oxidation of a perfluoroolefin to a perfluoroepoxide, followed by an ionic polymerization of the epoxide to an acyl fluoride terminated perfluoropolyether and conversion of the acyl fluoride end-groups to unreactive end-groups by decarboxylation reactions. The inability to form very high molecular weight polymers, the lack of stability of many perfluoroepoxides, and the extreme difficulty encountered when attempting to polymerize substituted perfluoroepoxide have been cited as drawbacks associated with this art. Additionally, anionic polymerization of perfluoroepoxide does not lend itself well to the manufacturing of perfluoro copolymers since perfluoroepoxide vary widely in reactivity.

An alternative synthetic method for the production of perfluoropolyethers involves the UV photolysis of tetrafluoroethylene and/or hexafluoropropylene in an inert solvent in the presence of oxygen. This multistep process yields an acyl fluoride terminated polymer containing both the —$CF_2$—, —$CF_2$—$CF_2$—$CF_2$—$CF_2$—, ($CF_2$—$CF_2$—O), and ($CF(CF_3)$—$CF_2$—O) repeating units as well as unstable peroxidic oxygen linkages ($CF_2$—O—O—$CF_2$). Treatment of the polymer at elevated temperatures and with fluorine gas gives a stable polymer containing perfluoroalkyl ends groups. See U.S. Pat. Nos. 3,665,041; 3,847,978; 3,770,792; and 3,715,378.

Although this process can be used successfully to prepare copolymers, the process is completely random with little control of the kinds and numbers of repeating units. Undesirable linkages such as the peroxidic oxygen and the poly(difluoromethylene) portions of the polymer are unavoidable and give the polymer undesirable properties for many applications. The formation of by-product polytetrafluoroethylene and the need for fairly exotic solvents adds significantly to the production costs of the polymer.

DISCLOSURE OF THE INVENTION

This invention comprises substantially 1:1 random and 1:1 alternating copolymers of difluoromethylene oxide and tetrafluoroethylene oxide. The perfluoroethers are formed by controlled direct perfluorination of methylene oxide/ethylene oxide copolymers.

Starting copolymers can be synthesized by ring-opening polymerization of 1,3-dioxolane. 1,3-dioxolane can be polymerized to give a copolymer of methylene oxide and ethylene oxide. Strict head-to-tail polymerization gives a 1:1 alternating copolymer while random head-to-tail/head-to-head polymerization gives a 1:1 random copolymer as depicted below:

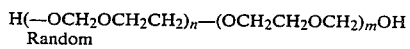

When treated with elemental fluorine in a controlled manner, the following perfluorocarbon polymers are formed:

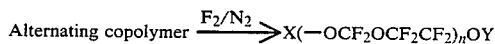

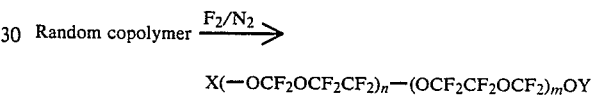

wherein X and Y may be the same or different and are —$CF_3$, —$C_2F_5$, —COF, —$CF_2OCF_3$, —$CF_2COF$, —COOH, or —$CF_2COOH$ and n and m are integers greater than 1. The molecular weight of the perfluoropolyethers can range from about 500 to about 200,000 amu; the lower molecular weight polymers are fluids; the higher molecular weight polymers are solids.

The perfluoropolyether fluids of this invention are useful as hydraulic fluids, heat transfer media or as bases for high performance greases which require fluids having a wide liquid range. The perfluoropolyether solids are useful as moldable elastomers or grease fillers. In addition, the solid polymers can be broken down, for example by pyrolysis at 600° C., to produce low molecular weight fluids.

BEST MODE OF CARRYING OUT THE INVENTION

The difluoromethylene oxide/tetrafluoroethylene oxide polymers are produced by reacting elemental fluorine with a hydrocarbon polymer containing both ethylene oxide and methylene oxide repeat units. The preferred method of synthesizing the starting polymers is by polymerization of 1,3-dioxolane. The ring-opening polymerization of 1,3-dioxolane using a highly selective (i.e., sterospecific) catalyst such as $ZnBr_2$/triethylaluminum gives a strictly alternating copolymer containing approximately equal numbers of ethylene oxide and methylene oxide repeating units. Polymers prepared from 1,3-dioxolane using less sterospecific catalysts such as strong acids can be used to prepare random copolymers. Polymers prepared by other synthetic techniques containing alternating or randomly distributed methylene oxide and ethylene oxide units along the polymer chain can be fluorinated to give a polymer similar to perfluoropolyethers prepared using polydioxolane.

The perfluoropolyethers of this invention are compounds, or mixtures thereof, having the following average formula:

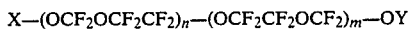

X—(OCF$_2$OCF$_2$CF$_2$)$_n$—(OCF$_2$CF$_2$OCF$_2$)$_m$—OY wherein X and Y are may be the same or different and are select from —CF$_3$, —C$_2$F$_5$, —COF, —CF$_2$OCF$_3$, —CF$_2$COF, —COOH, or —CF$_2$COOH. Subscripts n and m are average indicia of composition such that when n and m are both greater than 1 and are approximately equal, a random copolymer is defined and when either n or m approaches zero in value, the polymer is referred to as an alternating copolymer which can be represented as follows:

X—(OCF$_2$OCF$_2$CF$_2$)$_n$OY wherein X and Y may be the same or different and are —CF$_3$, —C$_2$F$_5$, —COF, —CF$_2$OCF$_3$, —CF$_2$COF, —COOH, or —CF$_2$COOH and wherein n is an integer greater than 1. Polymers containing intermediate values for n and m can be made, thus giving rise to properties common to both the random and alternating structures.

Because of the reactive nature of elemental fluorine, the LaMar process is the preferred fluorination technique. See R. J. Lagow and J. L. Margrave *Progress in Inorganic Chemistry*, 26, 161 (1979). When using such techniques, low concentrations and small quantities of fluorine are introduced initially in the fluorination reactor. Typically, fluorine gas is diluted with nitrogen; however, other diluents such as helium work equally as well. As the fluorination proceeds, higher fluorine concentrations and greater flows can be utilized without significant fragmentation of the polymer. Due to the extreme exothermic nature of the reaction, the fluorination must be carried out slowly unless provisions have been made for removing the heat of reaction. Submersion of the reactor in a cooled liquid bath or the use of an internal Freon cooling coil can satisfactorily remove the heat.

Fluorine gas is the preferred fluorinating agent and is available commercially at sufficient purity levels. Other fluorinating agents such as chlorine trifluoride or bromine trifluoride can be used; however, some chlorine or bromine substitution on the polymer generally will take place when these agents are used. The physical form of the polymer fluorinated is not critical; however, the fluorination of fine powders work especially well.

The fluorination can be carried out by passing dilute fluorine over the polymer in a stationary reactor, in a rotating drum reactor, in a fluidized bed reactor or in a solvent reactor. The polymer may be soluble in the solvent (which must be inert to fluorine gas) or it may be present as a slurry. Although a powdered polymer can be fluorinated in the neat form or in a solvent, the method of choice is to fluorinate the polymer in the presence of a hydrogen scavenger such as sodium fluoride (NaF) to adsorb the by-product hydrogen fluoride. The fluorination of ethers in the presence of hydrogen fluoride scavengers is described in U.S. patent application Ser. No. 796,623, filed Nov. 8, 1985, now abandoned, entitled "Perfluorination of Ethers in the Presence of Hydrogen Fluoride Scavengers", filed concurrently herewith, the teachings of which are incorporated by reference herein. A 5:1 ratio of NaF to polymer is preferred; however, a 4:1 ratio also works well.

Higher concentrations of NaF do not show a significant additional positive effect.

The LaMar direct fluorination of a polyether containing both ethylene oxide and methylene oxide units can be illustrated as follows:

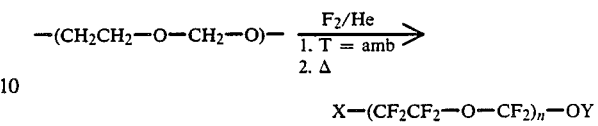

—(CH$_2$CH$_2$—O—CH$_2$—O)— $\xrightarrow[\text{2. }\Delta]{\text{F}_2/\text{He} \atop \text{1. T = amb}}$ X—(CF$_2$CF$_2$—O—CF$_2$)$_n$—OY wherein X and Y may be the same or different and are defined as —CF$_3$, —C$_2$F$_5$, —COF, —CF$_2$OCF$_3$, —CF$_2$COF, COOH, or CF$_2$COOH and n is an integer greater than 1.

Perfluoroethers of a broad range of molecular weights (500–200,000 amu) can be prepared depending upon the molecular weight of the starting hydrocarbon material and the fluorination conditions used. High fluorine concentrations, fast flow rates and elevated temperatures each favor fragmentation, thus lower molecular weight products are obtained. Milder fluorination conditions designed to prevent fragmentation lead to an extremely stable high molecular weight perfluoropolyether.

When mild fluorination conditions are used to fluorinate a high molecular weight polymer (greater than 20,000 amu), a white solid is typically obtained. Several schemes can be employed to prepare intermediate molecular weight fluids. One scheme is to perfluorinate a low molecular weight polymer using mild fluorination conditions. Treating a higher molecular weight polymer with slightly harsher fluorination conditions can lead to fluids when the conditions are chosen to give a controlled amount of chain cleavage. "Perfluorination" of a high molecular weight polymer using mild conditions can be used to replace a specified number of hydrogens with fluorine. A second step is designed to promote fragmentation. Elevated temperatures and high fluorine concentrations are used to give the perfluoropolyether fluid.

An alternate scheme, and possibly the method of choice for preparing a wide range of molecular weights involves the fluorination of a high molecular weight polymer using mild fluorination conditions to give a high molecular weight solid containing both the perfluoro alkyl and acyl fluoride end groups. Treatment of the polymer with pure fluorine at elevated temperature (>100° C.) gives a polymer containing only perfluoro alkyl end groups. The resulting high molecular weight solids can be broken down to lower molecular weight components by pyrolysis. This procedure is described in U.S. patent application Ser. No. 796,624, filed Nov. 8, 1985, now abandoned, entitled "Pyrolysis of Perfluoropolyethers" filed concurrently herewith, the teachings of which are incorporated by reference herein. Pyrolysis of the solid in the presence of nitrogen, air or fluorine gives lower molecular weight polymers. By selecting the proper pyrolysis temperature (400°–500° C.) and by carrying out the pyrolysis in a distillation-type apparatus, a well-defined boiling point range can be collected while less volatile components are returned to the high temperature portion of the apparatus to be further fragmented. If the pyrolysis is not carried out in the presence of fluorine, an additional fluorination at elevated temperatures is needed to remove the acyl fluoride terminal groups.

Various terminal groups are obtained in the fluorination and pyrolysis reactions. For many applications where an inert material is required, it is desirable to remove acid and acyl fluoride end groups. This is best accomplished by treating the polymer with pure $F_2$ at a temperature greater than 100° C. Some of the reactions occurring are represented by the following equations where $P_f$ corresponds to a perfluorinated polyether chain.

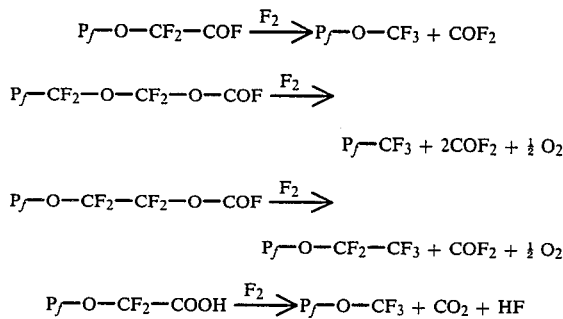

In addition to reactions of this type which relate exclusively to the terminal groups of the polymer, fluorine can react at elevated temperatures with stray hydrogens left on the polymer resulting in chain cleavage at that point. However, at 100° C., approximately 80% of the remaining hydrogens can be replaced with fluorine without chain degradation providing that fewer than 1% of the hydrogens remain in the polymer. Typically, upon completing the fluorination at elevated temperatures, the hydrogen content of the polymer is below 5 ppm as determined by Fourier transform infrared spectroscopy.

The perfluoropolyether fluids of this invention have distinct advantages over the existing fluid, namely Fomblin Z ™ fluids. Fomblin Z ™ fluids have a widely varying structure containing repeating units such as polydifluoromethylene, $-CF_2CF_2CF_2-$ and $-CF_2CF_2CF_2CF_2-$ which can increase the viscosity of the fluid at low temperatures. $^{19}F$ NMR analysis of Fomblin Z ™ fluids shows that the fluid structure is less random than previously thought and that the ethylene oxide and methylene oxide units tend to be present in blocks. Three or more sequential methylene oxide units act as a weak point in the polymer chain and limit the thermal and oxidative stability of Fomblin Z ™ fluids. Perfluoropolyethers of this invention contain either 1 or 2 methylene oxides in a row depending upon the starting material used. Like Fomblin Z ™ fluids, the polymers contain difluoromethylene oxide units (for good low temperature properties) and tetrafluoroethylene oxide (for improved high temperature stability).

The invention is illustrated further by the following examples:

EXAMPLE 1

1,3-dioxolane was polymerized by placing 250 g of the dried material in a nitrogen-purged 1 L flask. 1.6 g of ZnBr and 3.5 cc of a 5% triethylaluminum in toluene solution was added to the flask. After 3 days the polymerization was complete. The solid polymer was ground to 50 mesh or smaller using liquid nitrogen in a blender.

2 g of the sieved polydioxolane powder were mixed with 10 g of 100 mesh NaF powder in a nickel boat which was placed in an 18" long reactor constructed from 1½" nickel pipe containing Teflon O-ring sealed flanged ends. The assembled apparatus was flushed with 100 cc/min of $N_2$ for several hours before beginning the fluorination. The nitrogen flow was monitored with a glass rotameter while the fluorination flow rate was controlled with a Monel needle valve and monitored with a Hastings mass flow transducer, Type F-50M. The fluorine, supplied by Air Products, was used without further purification. The fluorine flow was set at 2 cc/min while the $N_2$ flow was maintained at 100 cc/min for 2 days. After 48 hours of relatively mild conditions, pure fluorine was used for 5 hours followed by 5 hours of exposure to pure fluorine at 110° C. to remove any acyl fluoride terminal groups. Upon completing the fluorination at elevated temperatures, the apparatus was again flushed with 100 cc/min $N_2$ for approximately one hour.

The solid reaction product was stirred with 75 ml of Freon 113 for approximately 1 hour. Upon removing the solid by filtration, 1.9 g of a low volatility, low viscosity oil was recovered from the Freon. The oil, when placed in a freezer held at −50° C., continued to flow well.

The Freon insoluble portion was washed with approximately 300 cc of distilled water to dissolve away the $NaHF_2$ leaving behind 0.8 g of a white free flowing powder which is a higher molecular weight version of the oil obtained (Total yield: 54.9%).

The fluid was characterized by $^{19}F$ NMR. Each of the individual spectral lines were assigned to a structure by comparison with the spectra of known perfluoro compounds. Spectral data for the fluid is summarized in the table below:

TABLE

| Structure | Chemical Shift (ppm) | Relative Intensity (%) |
|---|---|---|
| $-CF_3CF_2OCF_2O-$ | 50.0 | 1.9 |
| $-OCF_2CF_2O\underline{C}F_2OCF_2CF_2O-$ | 53.2 | 24.0 |
| $CF_3O\underline{C}F_2-O-$ | 55.5 | 3.6 |
| $\underline{C}F_3OCF_2CF_2O-$ | 57.3 | 5.2 |
| $CF_3O\underline{C}F_2O-$ | 59.2 | 4.5 |
| $\underline{C}F_3CF_2O-$ | 89.0 | 2.9 |
| $CF_3\underline{C}F_2O-$ | 90.3 | 1.9 |
| $-OCF_2O\underline{C}F_2CF_2O-$ | 92.5 | 51.3 |

On the basis of the NMR spectroscopic analysis, the average structure was the fluorocarbon analogue of the hydrocarbon starting material polydioxolane.

EXAMPLE 2

300 g of polydioxolane powder was dissolved in 500 ml of methylene chloride and mixed with 1200 g NaF powder. The solvent was evaporated and the resulting solid was ground cryogenically to give a powder which will pass a 50 mesh screen. The powder was placed in a 9" ID×2' long aluminum drum reactor which rotates at 5 rev./min/ The reactor was flushed with nitrogen for several hours prior to beginning the fluorination. A gas flow of 300 cc/min fluorine and 2 L/min nitrogen was maintained for 36 hours. The nitrogen was decreased to 1 L/min for an additional 12 hours. The polymer is treated with pure fluorine for several hours to insure perfluorination. A reactor temperature between 0° C. and +20° C. was desirable for best results. A final fluorination at 110° C. for 4 hours was used to replace any residual hydrogen with fluorine and to convert reactive acyl fluoride end groups to inert trifluoromethyl or pentafluoroethyl terminal groups. Extraction of the powder with 2 liters of Freon 113 gave 370 g of the desired difluoromethylene oxidetetrafluoroethylene oxide copolymer. An additional 160 g of a Freon insoluble solid was also obtained which can be converted to a fluid via pyrolysis.

EXAMPLE 3

Two grams of polydioxolane were placed in a nickel boat along with 10 g of NaF pellets (⅛" mesh). The boat was placed in a 1½" nickel tube reactor and flushed with 100 cc/min $N_2$ prior to beginning the fluorination. The fluorine and nitrogen flow rates were set at 2 cc/min and 100 cc/min, respectively. After 48 hours had elapsed, the sample was treated for 12 hours with pure fluorine at 100° C. Extraction of the product mixture with Freon 113 gave 1.5 g of a clear, low viscosity, nonvolatile oil. The $NaF/NaHF_2$ pellets were screened from the sample leaving behind 0.4 g of a white solid (Total yield: 38.6%). Infrared analysis and the NMR spectra of the oil were very similar to that observed for the oil prepared according to Example 1.

EXAMPLE 4

Fluorination of polydioxolane using the very mild conditions as described in Examples 1 and 2 gives a perfluoro product with a minimal amount of chain degradation occurring during the fluorination reaction. The oil present in the sample results from the direct fluorination of lower molecular weight chains in the hydrocarbon starting material. The oil to solid ratio of the final product can be increased by employing a two-step direct fluorination process. In the initial phase, dilute fluorine is passed over the sample to replace the majority of the hydrogen. The second step, perfluorination of the sample with pure fluorine at elevated temperature, give a product with a lower average molecular weight. The exothermicity of the reaction with elemental fluorine results in some chain fragmentation.

Two grams of polydioxolane was mixed with 10 g of NaF powder. The reactor was purged with 100 cc/min $N_2$ for 1 hour, followed by reaction of the polymer with 2 cc/min $F_2$ diluted with 100 cc/min $N_2$ for 48 hours. Next, the polymer was subjected to pure fluorine at 100° C. for 8 hours at which time some chain cleavage occurred. Using this procedure, 2.4 g of oil and 0.1 g of solid material are obtained (50.8% total yield).

INDUSTRIAL APPLICABILITY

The difluoromethylene oxide/tetrafluoroethylene oxide fluids of this invention are useful as oils, hydraulic fluids or as bases for high performance greases which require fluids having a wide liquid range. The fluids can be prepared in the molecular weight range desirable for a particular use. For example for vacuum pump oils, fluids ranging in molecular weight from about 5,000 to about 20,000 amu are desirable. Fluids ranging from about 750–2,000 amu are useful as vapor phase soldering fluids and those ranging from about 1,000–3,000 as hydraulic fluids. The perfluoropolyether solids are useful as moldable elastomers or grease fillers. In addition, the solid polymers can be broken down, for example by pyrolysis, at 500–600° C. to produce low molecular weight fluids.

The perfluormethylene oxide/ethylene oxide polymers of this invention have both very good thermal stability and excellent low temperature properties. They are devoid of particular molecular structures believed to be associated with poor thermal stability and high fluid viscosity.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:

1. Perfluoropolyethers of the formula:

$X—(OCF_2OCF_2CF_2)_nOY$ wherein X and Y may be the same or different and are $—CF_3$, $—C_2F_5$, $—COF$, $—CF_2OCF_3$, $—CF_2COF$, $—COOH$, or $—CF_2COOH$ and wherein n is an integer greater than 1; the perfluoropoly ethers having a molecular weight of about 500 to about 200,000 amu.

2. Perfluoropolyether fluids of the formula:

$X(OCF_2OCF_2CF_2)_nOY$ wherein X and Y may be the same or different and are $—CF_3$ or $—C_2F_5$ and wherein n is an integer greater than 1 such that the fluids range in molecular weight from 750–20,000 amu.

3. Perfluoropolyethers having an average formula of $X—(OCF_2OCF_2CF_2)_nOY$ wherein the terminal groups X and Y are selected from the group consisting of $—CF_3$, $—C_2F_5$, $—COF$, $—CF_2OCF_3$, $—CF_2COF$, $—COOH$ and $—CF_2COOH$ and wherein n is an integer greater than 1; the perfluoropolyethers having a molecular weight of about 500 to about 200,000 amu.

4. Perfluoropolyethers of claim 3, wherein the terminal group X and Y are $—CF_3$ or $—C_2F_5$.

5. A method of preparing perfluoropolyethers having an average formula of $X—(OCF_2OCF_2CF_2)_nOY$ wherein the terminal groups X and Y are selected from the group consisting of $—CF_3$, $—C_2F_5$, $—COF$, $—CF_2OCF_3$, $—CF_2COF$, $—COOH$ and $—CF_2COOH$ and wherein n is an integer greater than 1, the perfluoropolyethers having a molecular weight of about 500 to about 200,000 amu, comprising the steps of:

a. providing a copolyether consisting essentially of methylene oxide and ethylene oxide units in a molar ratio or about 1:1;

b. perfluorinating the copolyether by:
 (i) exposing the copolymer to a mixture of diluent gas and fluorine gas, the fluorine concentration being from about 1 to about 10%;
 (ii) increasing the concentration of fluorine gas until the polymer is exposed to pure fluorine gas thereby perfluorinating the copolyether to produce a perfluoro-polyether.

6. A method of claim 5, wherein the fluorination is accomplished in the presence of sodium fluoride.

7. A method of claim 5, further comprising:
 (iii) treating the polymer with fluorine gas at an elevated temperature greater than 100° C. sufficient to convert any acid or acyl fluorine end groups to perfluoroalkyl groups.

* * * * *